L. M. RAKESTRAW.
TIRE TOOL.
APPLICATION FILED NOV. 6, 1914.
1,135,392.
Patented Apr. 13, 1915.
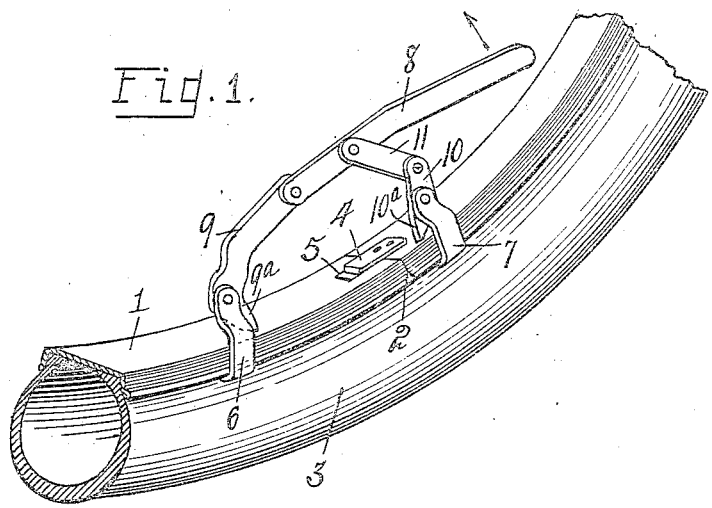
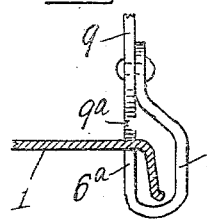
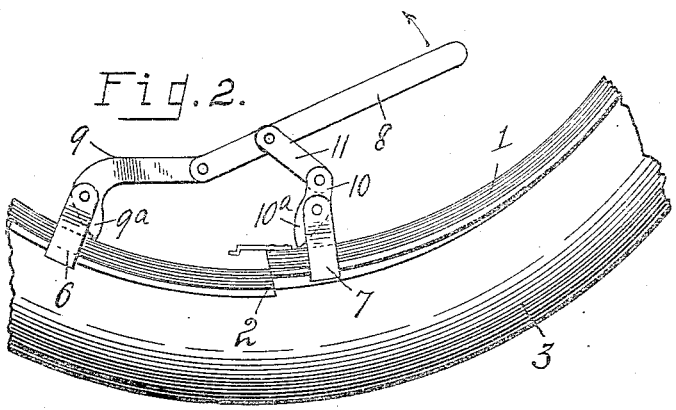
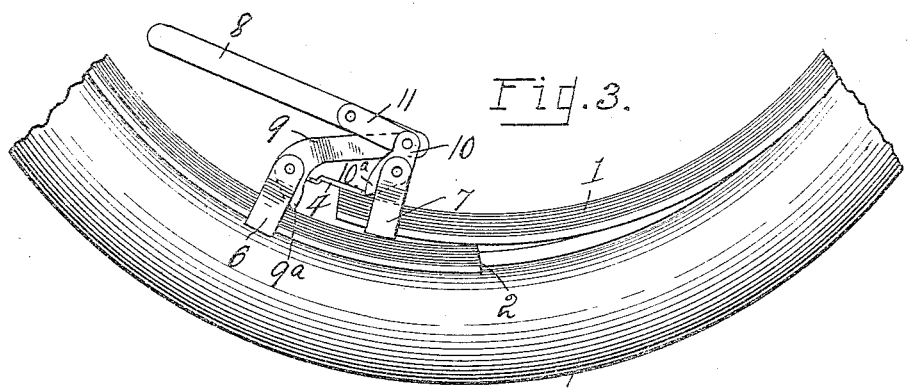
WITNESSES:
D. C. Walter
F. E. Aul
INVENTOR.
Lawrence M. Rakestraw
By Owen, Owen & Crampton,
Their attys.

UNITED STATES PATENT OFFICE.

LAWRENCE M. RAKESTRAW, OF TOLEDO, OHIO, ASSIGNOR TO THE TOLEDO AUTO TOOL COMPANY, OF TOLEDO, OHIO, A CORPORATION OF OHIO.

TIRE-TOOL.

1,135,392.  Specification of Letters Patent.  Patented Apr. 13, 1915.

Application filed November 6, 1914. Serial No. 870,641.

*To all whom it may concern:*

Be it known that I, LAWRENCE M. RAKESTRAW, a citizen of the United States, and a resident of Toledo, in the county of Lucas and State of Ohio, have invented a certain new and useful Tire-Tool; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile accessories, and particularly to a tool for use in connection with the placing on and removal of tires from demountable rims of the split-ring type.

The object of my invention is the provision of a simple, efficient and improved tool of this character, which is easily operable to firmly clamp the edges of split demountable rims of different types and styles and to quickly collapse a rim to permit a tire casing to be placed on or removed therefrom.

The invention is fully described in the following specification, and while, in its broader aspect, it is capable of embodiment in numerous forms, a preferred embodiment thereof, is illustrated in the accompanying drawings, in which,—

Figure 1 is a perspective view of a tool embodying the invention in operative engagement with a rim and in initial position. Figs. 2 and 3 are side views thereof with the former in partial collapsed position and with the latter in complete collapsed position, and Fig. 4 is an enlarged view of a portion of the tool illustrating its manner of gripping a rim.

Referring to the drawings, 1 designates a demountable rim of the split-ring type, being severed at 2 to provide opposing end portions which normally have end thrust abutting contact, as shown in Fig. 1.

3 designates a tire casing mounted on the rim. The rim is made of spring metal to permit a limited contraction or expansion thereof without breaking. A tongue 4 fixedly projects from one end of the rim at the inner side thereof and has its free end provided with a lug or offset for interengaging with a registering socket 5 in the other end portion of the rim when the rim ends are in alined end thrust abutment, as shown in Fig. 1.

The tool comprising my invention is provided with a pair of rim edge engaging hooks 6 and 7, which have their hooked portions of suitable size and shape to have hooked engagement with the rim edges of any of the numerous styles of demountable rims. The shank end of each hook is preferably inwardly offset relative to the lip portion $6^a$ of the hook, as best shown in Fig. 4. The hook 6 has its offset portion pivotally connected to one end of an operating lever 8 by a link 9 and the hook 7 has its offset portion pivotally connected to said lever, at a short distance from the end thereof to which the link 9 is pivoted, through the medium of a pair of pivotally connected links 10 and 11. Each of the links 9, 10 and 11 is pivotally connected to the part to which it is attached. The links 9 and 10 are carried at the inner sides of the shanks of the respective hooks so as to place them over or in substantial opposing relation to the lip portion of the respective hook. The link 9 has a rim gripping beak or jaw $9^a$ angling inwardly from the hook connecting end thereof or toward the other hook of the set whereby a movement of the outer or lever connecting end of the link 9 toward the rim will swing the beak $9^a$ into gripping engagement with the inner side of the rim 1 in opposition to the hooked engagement of the hook with the rim edge. The link 10 has a similar beak or jaw portion $10^a$, which is disposed to have gripping engagement with the inner side of the rim in opposition to the hooked engagement of the hook 7 therewith when the outer end of the link 10 is swung toward the link 9. It will be understood that the hooks 6 and 7 may have the lip portions thereof in gripping engagement with a rim in opposition to the respective jaws $9^a$ and $10^a$ should said lips be longer than the depth of the rim flange, or the looped portions of the hooks may have gripping engagement with the outer edge of the edge flange should the flange be of a greater depth than the lips of the hooks. In either case the hooks oppose the gripping engagement of the jaws 9ª and 10ª, respectively, with the rim.

In the use of my tool the hooks 6 and 7 are placed in hooked engagement with the rim flange at opposite sides of the severed point 2 thereof, with the hook 6 preferably placed a greater distance from said point than the hook 7, the tool, when first placed in engagement with a rim, having the parts thereof relatively positioned with respect to the rim, substantially as shown in Fig. 1. Upon the application of pressure to the lever 8 in the direction indicated by the arrow in Figs. 1 and 2, the links 10 and 11 first tend to straighten and to force the beak or jaw 10ª into gripping engagement with the inner side of the rim. When the lever 8 has been moved a sufficient extent to place the link 10 in gripping engagement with the rim the fulcrum end of the lever will then begin to exert considerable inward pressure toward the rim on the outer end of the link 9, thereby tending to force the beak or jaw 9ª of such link into gripping engagement with the rim, as will be clearly understood by reference to the drawings. Upon a continued movement of the lever 8 after both jaws 9ª and 10ª have been placed in gripping engagement with the rim, the lever 8, links 10 and 11 and hook 7 will effect an inward drawing of the end of the rim to which the finger 4 is attached and move it out of alined register with the other end of the rim and in position to be drawn thereover. When one rim end has been moved inwardly from register with the other, the lever 8 will have approximately completed its lifting or inward moving action on the hook 7 so that a further movement of the lever in the direction of the arrow will cause a lengthwise drawing of one end over the other to place the same in the lapped relation shown in Fig. 3, whereby to effect a sufficient collapsing of the rim to permit a tire to be easily placed on or removed from engagement with the outer channeled side of the rim. It is evident that the extent of lapping of the rim ends will depend upon the space between the hooks 6 and 7 when first placed in engagement with a rim and the distance the hook 7 is placed from the point of separation 2 of the rim.

The feature of improvement of my tool over tools heretofore used resides in the capability of the tool for use in connection with rims having various shapes and styles of edge flanges, thereby requiring only one tool for the collapsing of rims of this character of different styles and make.

I wish it understood that my invention is not limited to any specific construction, arrangement or form of the parts, as it is capable of numerous modifications without departing from the scope of the claims.

Having thus described my invention, what I claim as new, and desire to secure by Letters Patent, is,—

1. A tool of the class described having rim edge engaging hooks, an operating lever, and link connection between each hook and the lever, each of said link connections being operable in conjunction with its hook to firmly grip a rim when the lever is moved to effect a collapsing of an engaged rim.

2. A tool of the class described having a pair of rim engaging members, an operating lever, and link connection between each of said members and the lever operable by a movement of the lever to effect relative to and fro movements of said members, said link connections each having a part for gripping engagement with the rim in coaction with the associated rim engaging member when the lever is operated in one direction.

3. A tool of the class described having a pair of rim engaging members, an operating lever, a link pivotally connecting one of said members to the fulcrum end of the lever and a link pivotally connected to the other one of said members and having connection with said lever in spaced relation to its fulcrum end, each of said links having its member carrying end provided with a jaw for gripping coaction with a rim in opposition to the respective rim engaging member when the lever is moved in one direction.

4. In a tool of the class described, a pair of rim edge engaging members, an operating lever, a single link pivotally connecting one of said members to the fulcrum end of said lever and having a jaw at one end for gripping engagement with the rim in conjunction with one of said members, and a plurality of links pivotally connecting the other of said members to said lever a distance from its fulcrum end, one of said latter links being provided at one end with a jaw for gripping engagement with the rim in conjunction with the other of said members.

5. A tool of the class described having spaced rim edge engaging members and a plurality of links movably connecting said members, one of said links being extended and serving as a control lever and others of said links having jaw parts which coöperate with said members to grip a rim when the link serving as a lever is moved in one direction.

6. A tool of the class described having a rim engaging member, a lever, means pivotally connecting said member and the fulcrum end of said lever and having a jaw which is operable by a predetermined movement of the link to coact with said member to grip the rim, and means for connecting said lever to a rim in spaced relation to said member, whereby a movement of the operating lever in one direction will effect a collapsing of an engaged rim.

7. A tool of the class described having a pair of rim engaging members, a lever having pivotal connection with one of said members, and link means connecting the other of said members and lever, and having a jaw for gripping a rim in coaction with the associated member when the lever is moved in one direction.

In testimony whereof, I have hereunto signed my name to this specification in the presence of two subscribing witnesses.

LAWRENCE M. RAKESTRAW.

Witnesses:
F. E. AUL,
M. H. MAYERS.